US007261462B2

(12) United States Patent
Hsieh

(10) Patent No.: US 7,261,462 B2
(45) Date of Patent: Aug. 28, 2007

(54) CORE STOPPING STRUCTURE FOR AN ELECTRONIC CLINICAL THERMOMETER

(75) Inventor: Chih-Wei Hsieh, Chu Pei (TW)

(73) Assignee: Actherm Inc., Hsinchu Hsien (TW)

( * ) Notice: Subject to any disclaimer, the term of this patent is extended or adjusted under 35 U.S.C. 154(b) by 3 days.

(21) Appl. No.: 11/234,093

(22) Filed: Sep. 26, 2005

(65) Prior Publication Data

US 2006/0203885 A1    Sep. 14, 2006

(30) Foreign Application Priority Data

Mar. 14, 2005    (TW) .............................. 94107703 A

(51) Int. Cl.
*G01K 1/00*    (2006.01)
(52) U.S. Cl. ..................... 374/208; 374/163; D10/57
(58) Field of Classification Search ................ 374/208, 374/163, 170, 159; D10/57; 600/474
See application file for complete search history.

(56) References Cited

U.S. PATENT DOCUMENTS

| 4,549,819 A | * | 10/1985 | Muramoto et al. ......... 374/178 |
| 4,743,121 A | * | 5/1988 | Takagi et al. ................ 374/163 |
| 5,013,161 A | * | 5/1991 | Zaragoza et al. ........... 374/208 |
| 5,165,798 A | * | 11/1992 | Watanabe .................... 374/208 |
| 6,394,648 B1 | * | 5/2002 | Tseng .......................... 374/208 |
| 6,698,922 B2 | * | 3/2004 | Adachi et al. .............. 374/208 |
| 6,981,796 B2 | * | 1/2006 | Hsieh .......................... 374/163 |
| 2004/0105487 A1 | * | 6/2004 | Chen ........................... 374/163 |

* cited by examiner

*Primary Examiner*—Brij Shrivastav
*Assistant Examiner*—Megann E Vaughn
(74) *Attorney, Agent, or Firm*—Leong C Lei

(57) ABSTRACT

A core stopping structure for an electronic clinical thermometer comprising a stopper protruded out of an inner wall of a thermometer body, a stopping member provided on a core and configured to block relative movement of the stopper, whereby when the core is pulled out of the thermometer for a predetermined length, the stopper will block the stopping member thereby preventing the core from further moving out of the thermometer body and therefore preventing the conductive wire connected with the core from breaking.

7 Claims, 9 Drawing Sheets

US 7,261,462 B2

CORE STOPPING STRUCTURE FOR AN ELECTRONIC CLINICAL THERMOMETER

BACKGROUND OF THE INVENTION (a) Technical Field of the Invention

This invention relates to a core stopping structure for an electronic clinical thermometer, and in particular to one which can prevent a core from moving further out of an electronic clinical thermometer after the core has been withdrawn out of the electronic clinical thermometer for a predetermined length, thereby preventing the conductive wire from breaking and therefore assuring the normal operation of the thermometer.

(b) Brief Description of the Prior Art

Prior to the invention of the electronic clinical thermometer, the mercury clinical thermometer was widely used for measuring the temperature of human bodies. Based on the theory that mercury expands when encountering heat but contracts when encountering cold, the mercury clinical thermometer was invented. In the process of taking body temperature, when the temperature sensing probe (the heat sensor tube) of the mercury clinical thermometer is in contact with heat, the mercury will expand, pushing a portion of the mercury into a capillary tube thereby allowing the user to view the temperature reading displayed on the exterior of the capillary tube. In recent years, due to the high level of pollution in mercury, the electronic clinical thermometer, utilizing electronic technology, has been developed and has gradually replaced the highly polluted mercury clinical thermometer of old days.

When the battery in an electronic clinical thermometer is used up, the user must pull out the core to replace the battery. Since the conventional core is connected to the conductive wire while the other end of the conductive wire and a temperature sensor are fixedly mounted within a metal tip of the front end of the thermometer, the user is uncertain as to how far to pull out the core, and will often pull off the conductive wire, making the thermometer unable to work properly.

Therefore, it is an object of the present invention to provide a core stopping structure of an electronic clinical thermometer which can obviate and mitigate the above-mentioned drawbacks.

SUMMARY OF THE INVENTION

It is the primary object of the present invention to provide a core stopping structure for an electronic clinical thermometer, which can prevent a core from moving further out of an electronic clinical thermometer after the core has been withdrawn from the electronic clinical thermometer for a predetermined length thereby preventing the conductive wire from breaking. The core stopping structure includes a stopper protruded from an inner wall of the body of the electronic clinical thermometer and a blocking member or recess provided on the predetermined position of the core, so that when the core is pulled out for battery replacement, the stopping flange will block the stopper from further moving out of the thermometer body after the core has been pulled out for a predetermined length thereby preventing the conductive wire from breaking.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
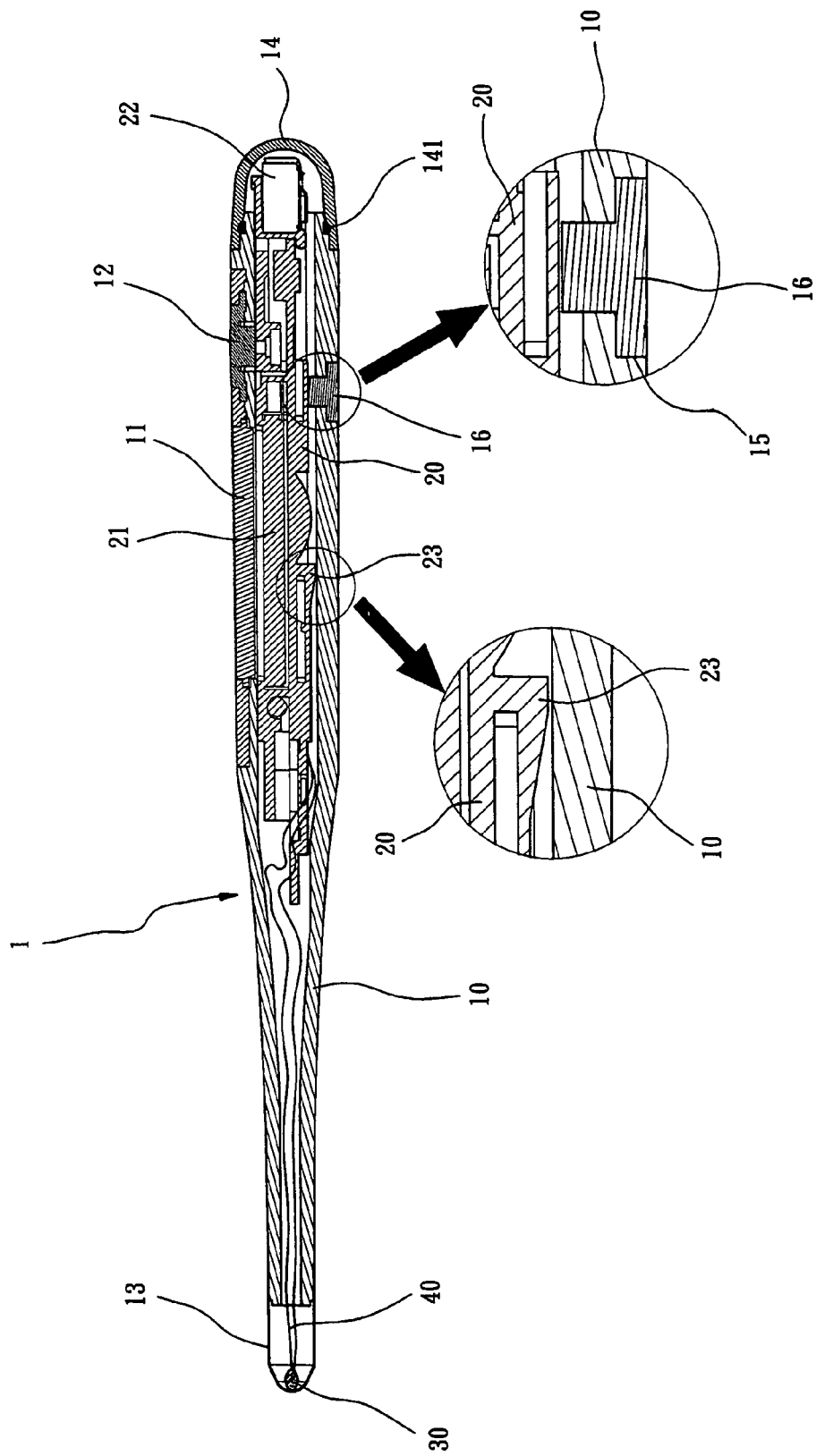
FIG. 1 is a sectional view of the present invention.
Figure 2:
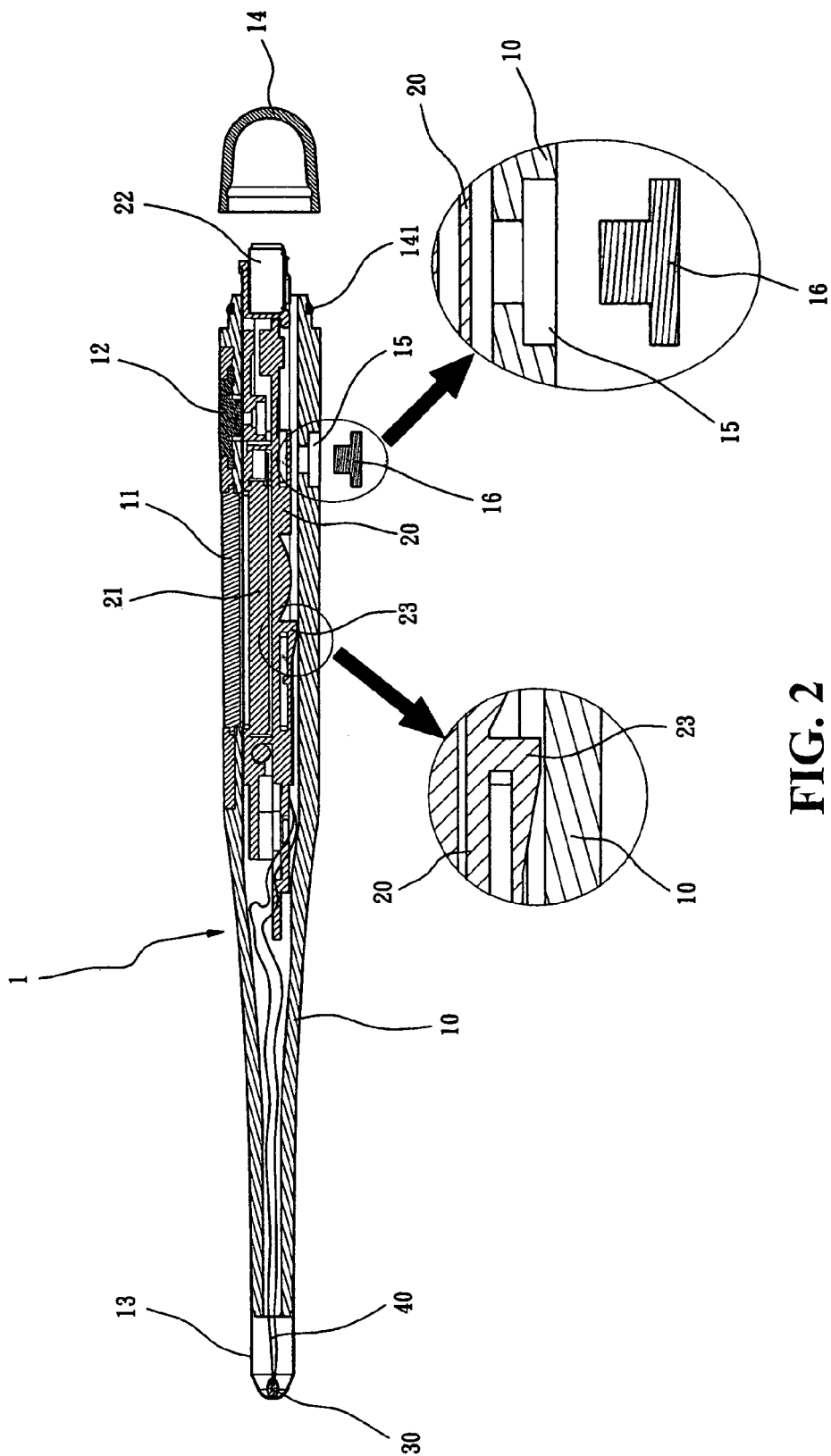
FIG. 2 is another sectional view of the present invention, illustrating the disengagement of the stopper with the hole.
Figure 3:
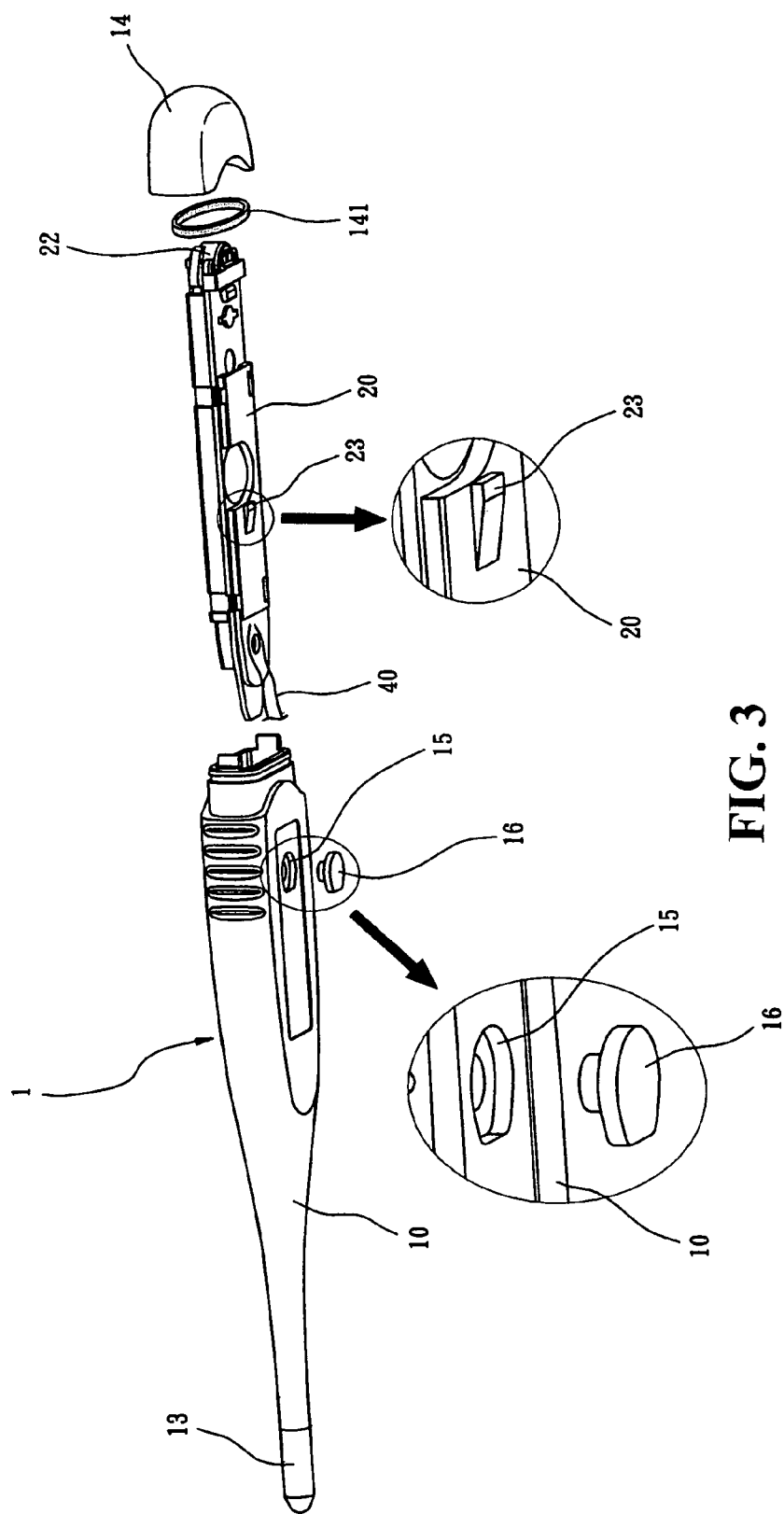
FIG. 3 is an exploded view of the present invention.

Referring to FIGS. 1, 2 and 3, the core stopping structure according to the present invention is provided in an electronic clinical thermometer 1 which comprises a thermometer body 10, a core 20, a sensor 30 and a conductive wire 40.

The thermometer body 10 is provided on the top with a window 11 for viewing the temperature reading and a button 12 close to the window 11. Further, the thermometer body 10 has a metal probe 13 at a first end and a detachable cap 14 at a second end. A rubber ring 141 is mounted on the second end of the thermometer body 10 so as to prevent permeation by water when the second end of the thermometer body 10 is engaged with the detachable cap 14.

The core 20 in which are mounted relevant sensing circuit and electronic components has a display 21 capable of showing temperature signals under the window 11. An end of the core 20 is provided with a battery 22.

The temperature sensor 30 is mounted within the metal probe 13.

The conductive wire 40 has an end connected to the temperature sensor 30 and another end connected to the core 20 for calculating correct temperature data.

Figure 8:
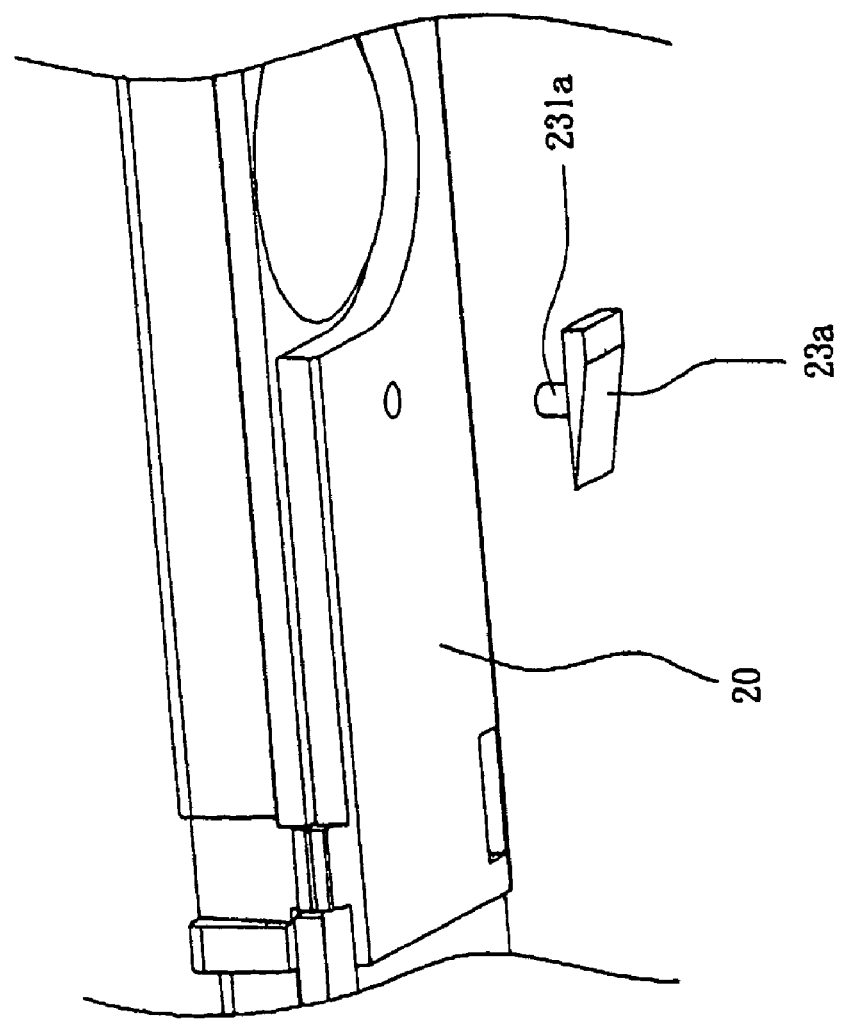
FIG. 8 is an enlarged view showing the relationship between the blocking member and the core.
Figure 9:
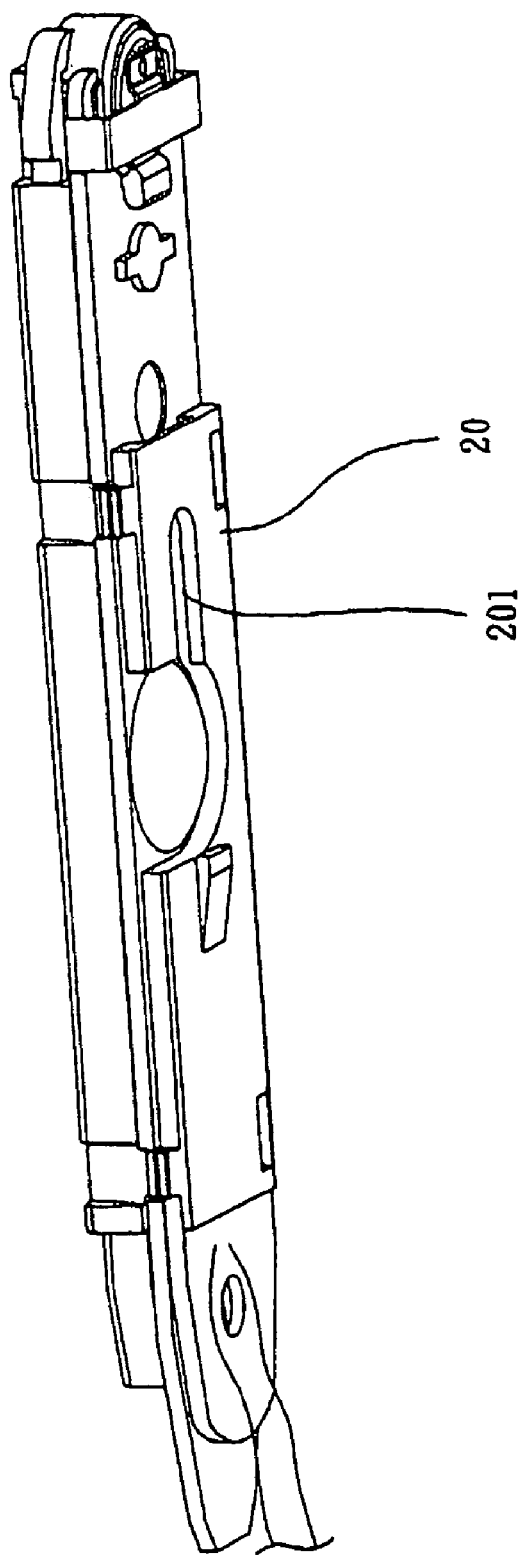
FIG. 9 is a perspective illustrating the guiding groove.

The bottom side of the thermometer body 10 has an opening 15 in which is fitted a stopper 16 protruding upwardly out of the inner wall of the thermometer body 10. The core 20 has an outer side provided wit a stopping flange 23, the outer side being opposite to the inner wall of thermometer body 10 engaged with the stopper 16. The stopping flange 23 may be integrally formed with the outer side of the core 20 or may be replaced with a separate member such as a blocking member 23a with a pin 231a engageable with the outer side of the core 20 (see FIG. 8). The outer side of the core 20 has a guiding groove 201 (see FIG 9) for guiding relative movement of the stopper 16 so that when the core 20 is moved along the thermometer body 1, the stopper 16 will be guided against the stopping flange 23.

Figure 4:
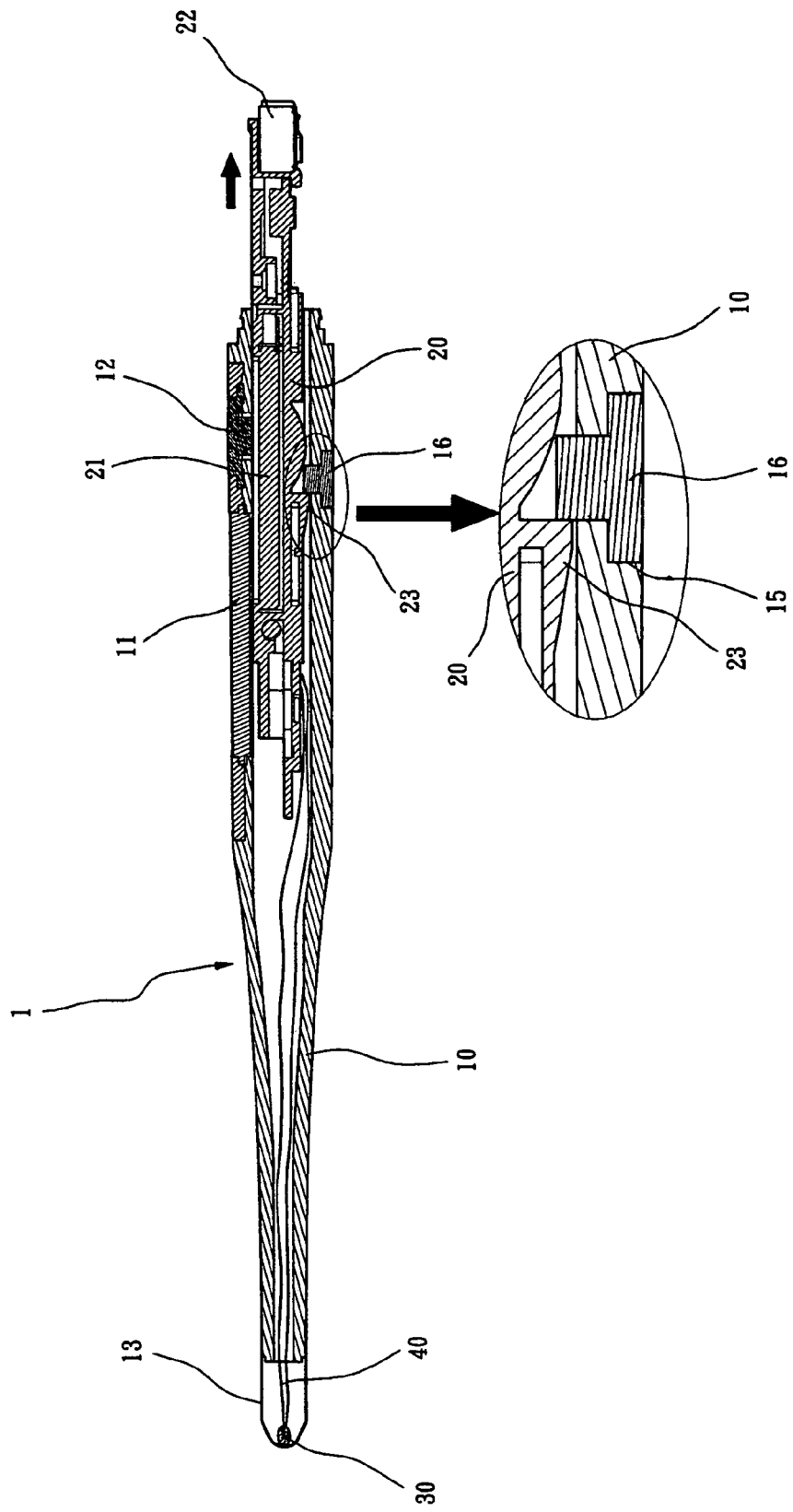
FIG. 4 illustrates the working principle of the present invention.

As shown in FIG. 4, when the core 20 is moved out of the thermometer body 10 for a predetermined distance in order to replace the battery 22, the stopping flange 23 of the core 20 is blocked by the stopper 16 thereby preventing the core 20 from further sliding out of the thermometer body 10 and therefore preventing the conductive wire 40 from breaking. As a consequence, the normal operation of the core 20 can be assured.

Figure 5:
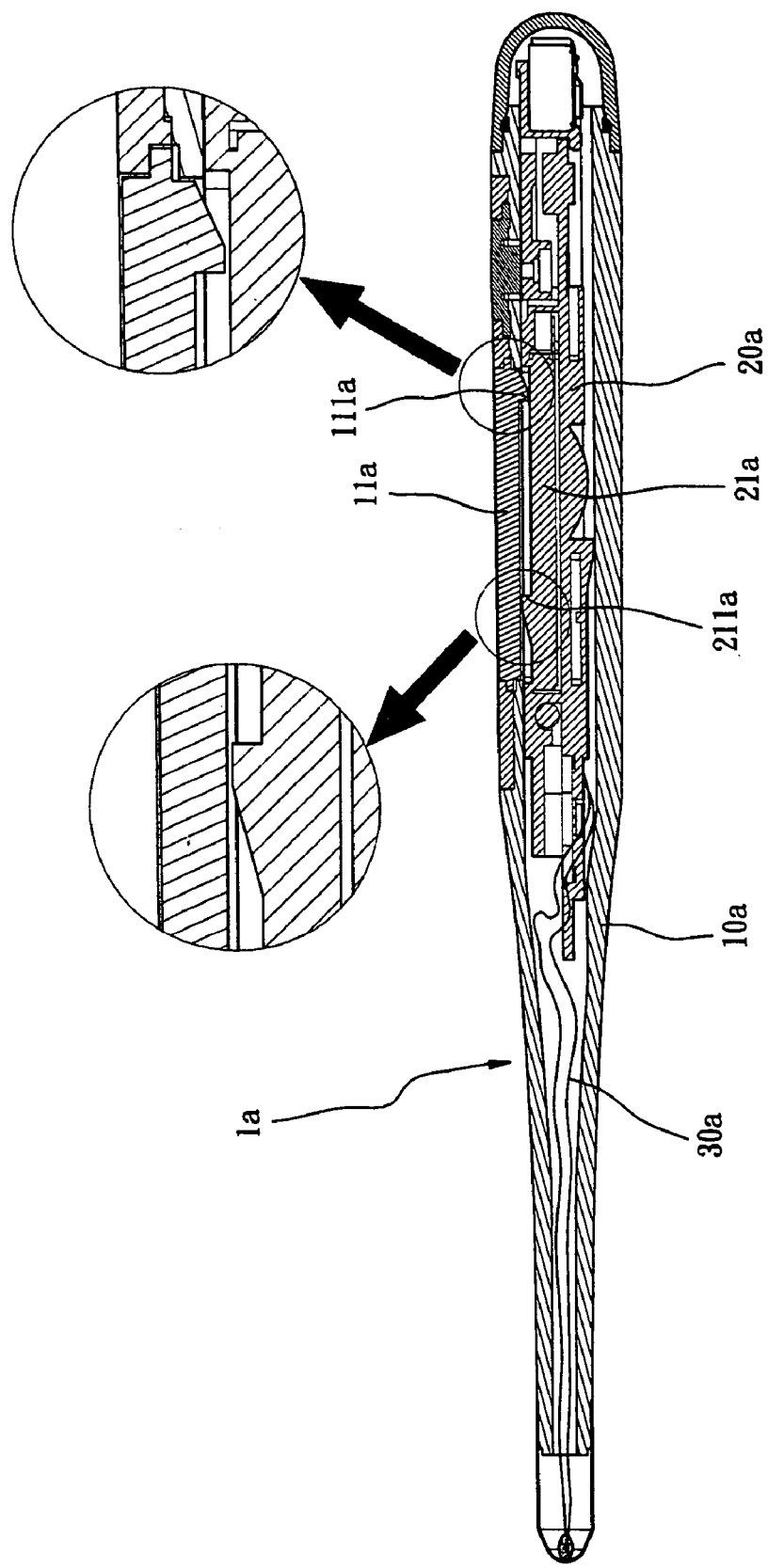
FIG. 5 illustrates a second preferred embodiment of the present invention.

FIG. 5 illustrates a second preferred embodiment of the present invention. As shown, the thermometer body 10a has a window 11a formed at the peripheral edge with a protuberance 111a, and the display 21a of the core 20a is provided at the peripheral edge with a projection 211a aligned with the protuberance 11a. Hence, when the core 20a is moved out of the thermometer body 10a, the projection 211a of the core 20a will be blocked by the protuberance 11a of the thermometer body 10a thereby preventing the conductive wire 30a from breaking and therefore ensuring the normal operation of the core 20a.

Figure 6:
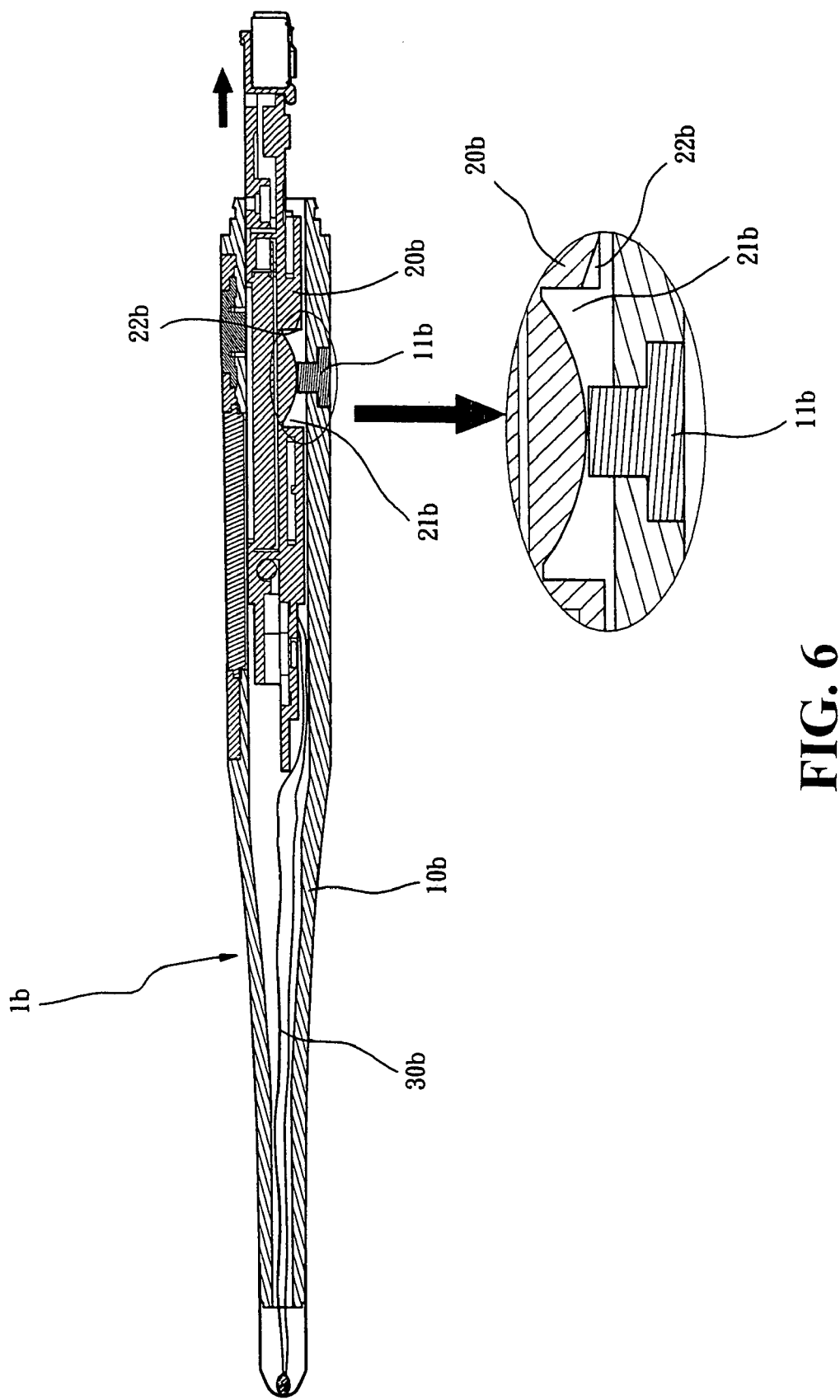
FIG. 6 illustrates a third preferred embodiment of the present invention.

FIG. 6 illustrates a third preferred embodiment of the present invention. As shown, the bottom side of the thermometer body 10b has an opening in which is fitted a stopper 11b protruding upwardly out of the inner wall of the thermometer body 10b. The core 20b has a recess 21b adapted to receive the stopper 11b. The recess 21b is provided at the front edge with a groove 22b for guiding the stopper 11b into the recess 21b through the groove 22b. When the core 22b is moved out of the thermometer body 10b for a predetermined distance, the stopper 11b will be fitted in the recess 21b of the core 20b thereby preventing the core 22b from further moving out of the thermometer body 10b and therefore preventing conductive wire from breaking. Hence, the normal operation of the core 20b can be assured.

Figure 7:
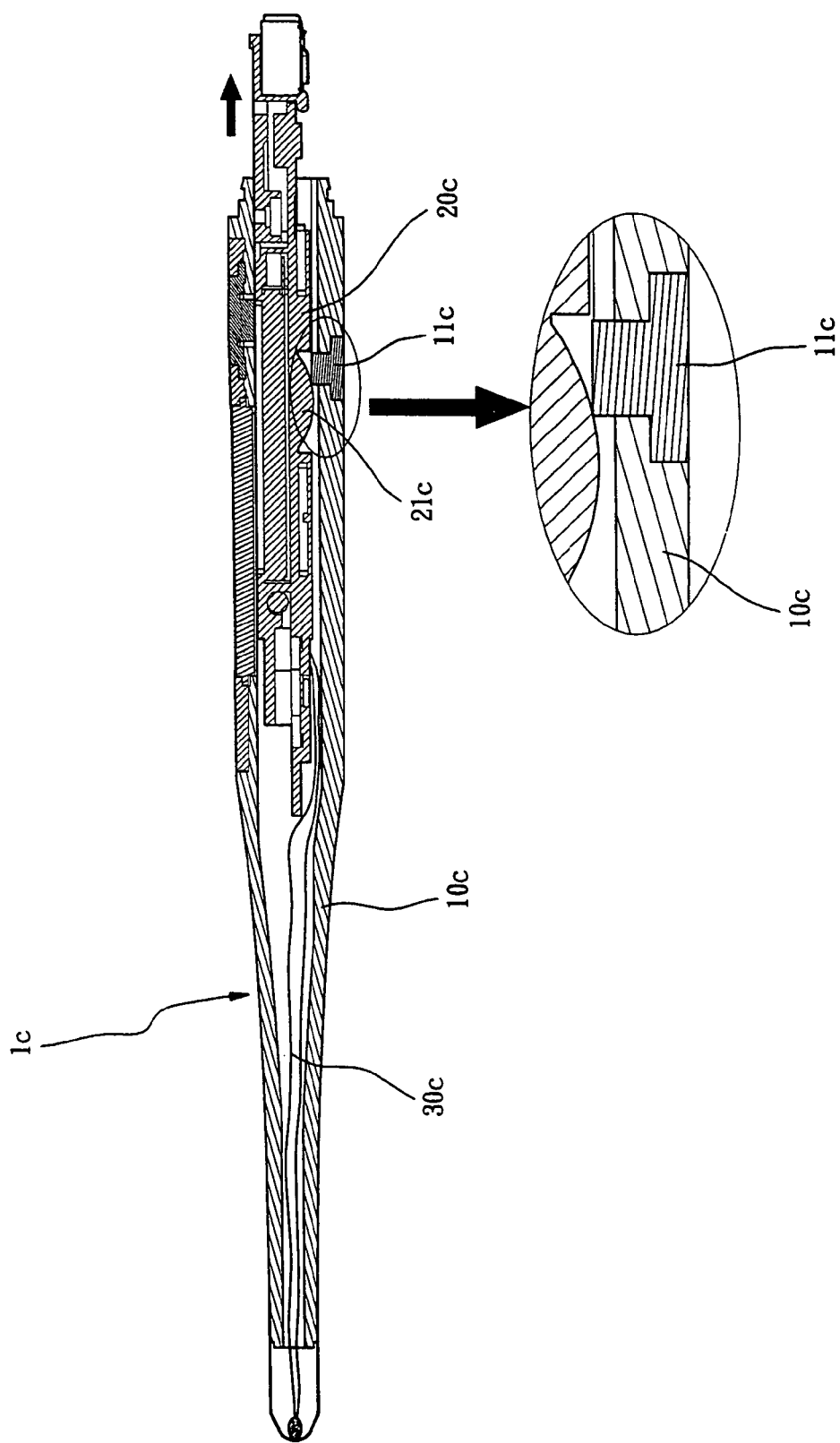
FIG. 7 illustrates a fourth preferred embodiment of the present invention.

FIG. 7 illustrates a fourth preferred embodiment of the present invention. As shown, the bottom side of the thermometer body 10c has an opening in which is fitted a stopper 11c protruding upwardly out of the inner wall of the thermometer body 10c. The core 20c has a bulge 21c on the outer surface opposite to the stopper 11c. The bulge 21c may be an electronic component or a plastic projection 21c. When the core 22c is moved out of the thermometer body 10c for a predetermined distance, the stopper 11c will be blocked by the bulge 21c thereby preventing the core 22c from further moving out of the thermometer body 10c and therefore preventing the conductive wire 30c from breaking. Hence, the normal operation of the core 20c can be assured.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A core stopping structure for an electronic clinical thermometer comprising a stopper protruded out of an inner wall of a thermometer body, a stopping member provided on a core and configured to block relative movement of said stopper, whereby when said core is pulled out of said thermometer for a predetermined length, said stopper will block said stopping member thereby preventing said core from further moving out of said thermometer body and therefore preventing a conductive wire connected with said core from breaking; wherein said stopping member is an edge of said core.

2. The core stopping structure for an electronic clinical thermometer as claimed in claim 1, wherein said stopping member is an extension of an edge of said core.

3. The core stopping structure for an electronic clinical thermometer as claimed in claim 1, wherein said stopping member is an electronic component or a plastic projection mounted on said core.

4. The core stopping structure for an electronic clinical thermometer as claimed in claim 1, wherein said inner wall of said thermometer body has a hole at a predetermined position thereof in which is fitted said stopper so that a portion of said stopper protrudes out of said inner wall.

5. The core stopping structure for an electronic clinical thermometer as claimed in claim 1, wherein said stopping member is integrally formed with a surface of said core.

6. The core stopping structure for an electronic clinical thermometer as claimed in claim 1, wherein an outer side of said core has a guiding groove.

7. A core stopping structure for an electronic clinical thermometer comprising a thermometer body having an inner wall provided with a stopper protruding upwardly out of said inner wall, a recess provided on a core and adapted to receive said stopper, whereby when said core is moved out of said thermometer body for a predetermined length, said stopper will be fitted in said recess thereby preventing said core from further moving out of said thermometer body and therefore preventing a conductive wire connected with said core from breaking, wherein said recess has a front edge provided with a groove for guiding said stopper into said recess.

* * * * *